United States Patent
Hatfield

(10) Patent No.: US 7,297,753 B2
(45) Date of Patent: Nov. 20, 2007

(54) REDUCTION OF PERMEATION THROUGH A POLYMER

(75) Inventor: David B. Hatfield, Oracle, AZ (US)

(73) Assignee: Raytheon Company, Waltham, MA (US)

( * ) Notice: Subject to any disclaimer, the term of this patent is extended or adjusted under 35 U.S.C. 154(b) by 123 days.

(21) Appl. No.: 10/894,753

(22) Filed: Jul. 20, 2004

(65) Prior Publication Data

US 2006/0020107 A1 Jan. 26, 2006

(51) Int. Cl.
*C08F 6/00* (2006.01)
(52) U.S. Cl. .................. 528/196; 264/176.1; 264/219; 525/185; 525/539; 528/480
(58) Field of Classification Search ............ 264/176.1, 264/219; 525/185, 539; 528/480
See application file for complete search history.

(56) References Cited

U.S. PATENT DOCUMENTS

| | | | |
|---|---|---|---|
| 4,332,922 A | | 6/1982 | Kossmehl et al. |
| H1169 H | * | 4/1993 | Machado ..................... 525/185 |
| 5,364,454 A | * | 11/1994 | Bikson et al. .................. 95/45 |
| 5,770,135 A | | 6/1998 | Hobbs et al. |
| 5,912,279 A | * | 6/1999 | Hammel et al. ............ 521/146 |
| 6,255,359 B1 | | 7/2001 | Agrawal et al. |
| 6,423,387 B1 | * | 7/2002 | Zollinger et al. .......... 428/35.2 |

OTHER PUBLICATIONS

ASTM Standard E96-00, Standard Test Methods for Water Vapor Transmission of Materials, pp. 1-8, 2000.

* cited by examiner

*Primary Examiner*—Terressa Boykin
(74) *Attorney, Agent, or Firm*—John J. Horn

(57) ABSTRACT

A method for reducing the permeation rate of a permeable species through a polymeric material includes identifying a solubility-increasing species in the polymeric material having a reversible affinity for the permeable species, and removing or altering at least a portion of the solubility-increasing species in the polymeric material. In one application, the permeable species is water, and the solubility-increasing species is hygroscopic. A example of a polymeric material is an elastomeric polymer. The solubility-increasing species may be removed in part from an existing piece of the polymeric material by leaching it out. The polymeric material may instead be manufactured with a reduced content of the solubility-increasing species.

19 Claims, 2 Drawing Sheets

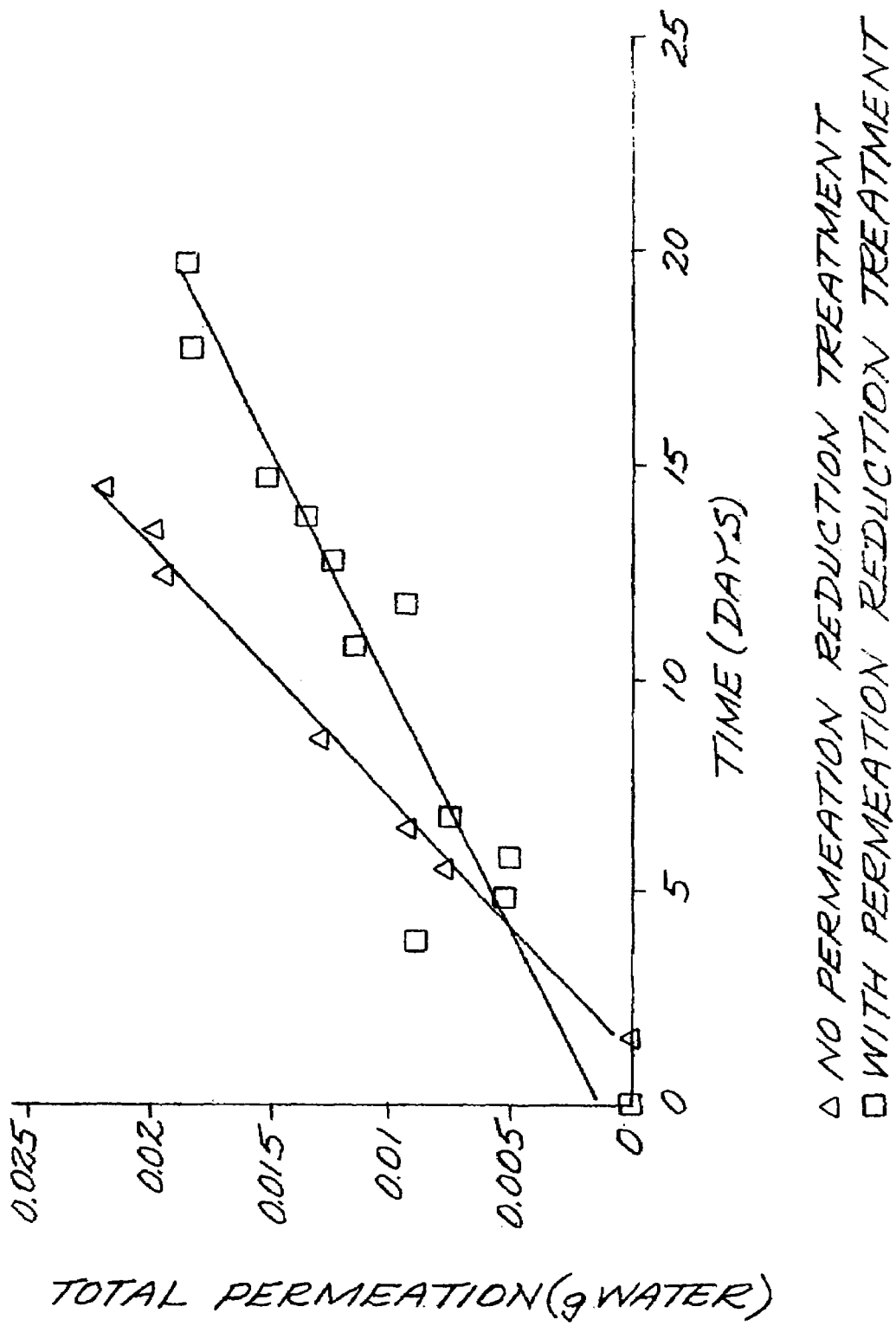

REDUCTION OF PERMEATION THROUGH A POLYMER

This invention relates to the permeation of a permeable species through a polymer, and more particularly to the reduction of permeation of water through an elastomer.

BACKGROUND OF THE INVENTION

Polymers are widely used in container, sealing, and protective applications. Elastomeric polymers, for example, are used as containers and also for seals such as the familiar O-ring seal. In the container application, the polymeric material is used as a container or as the lining in a container of another material. In the sealing application, the polymer seal is positioned at a joint between two components and the components are tightened together with the polymer seal between them. The polymer seal reduces the leakage of fluids (i.e., either gases or liquids) through the joint. In each application, it is important that the polymeric material minimize the permeation of diffusing species of interest therethrough.

In most applications, the conventional, commercially available polymeric materials and "hermetic" packaging are fully satisfactory to prevent the macroscopic leakage of fluids. Other applications have more stringent requirements, and even a minute leakage of tiny amounts of fluid through the container wall or past the seal cannot be tolerated. In one example, electronic circuitry such as a guidance system may be damaged by water vapor that permeates into its container, condenses, and corrodes or short circuits the electronics. In another example, water vapor leaking into an optical system may fog the lenses, mirrors, detectors, and other optical components. In these applications, leakage of tiny amounts of fluids into the containers or past the seals can have disastrous effects, particularly where the pre-service storage period may be long, the service life is long, or the environments are demanding. Conventional "hermetic" packaging and interior pressures of inert gases are not sufficient to reduce the leakage sufficiently for some of these applications, and damaging amounts of water vapor or other contaminant fluids may reach the sensitive components.

The mechanical performance of the seals in such stringent applications has been investigated. That is, structures, sizes, thicknesses, loads, and other parameters for containers, and groove sizes and profiles for seals have been studied and optimized. This work has not led to the required container or sealing performance for the most demanding applications.

Instead, it has become apparent that the permeation of the fluid through the polymeric material is the most significant cause of fluid intrusion. With this fact in mind, various choices of polymeric materials have been considered. For example, butyl rubber elastomeric materials are found to have very low moisture permeability, but they have less-than-optimal chemical stability in many common environments such as those containing jet fuel. Nitrite rubber, on the other hand, is highly stable in an environment containing jet fuel, but has a limited lifetime in air. Fluorocarbon and ethylene propylene elastomeric materials have good chemical stability, but higher water permeation. Silicone and fluorosilicone materials have excellent chemical stability, but permit permeation at a rate 300 times greater than that of butyl rubber.

No elastomeric container or seal material has been found with a combination of good chemical stability and sufficiently low permeability for the most demanding applications. As a result, a material with a higher permeability than desired is often chosen for an application because of other considerations such as physical properties, chemical stability and compatibility, and/or thermal properties.

There is a need for improved polymeric materials with acceptable mechanical and chemical properties, and reduced permeability, for use in containers, seals, and other applications. The present invention fulfills this need, and further provides related advantages.

SUMMARY OF THE INVENTION

The present invention provides a polymer with acceptable mechanical performance and chemical stability, and significantly reduced permeability to fluids. It allows existing materials to be processed into new materials with essentially the same physical properties as the starting material, but with reduced permeability for permeating fluid species. This approach has the important advantages of reduced material risk, reduced development time, reduced cost, and increased acceptance of the reduced-permeability material.

In accordance with the invention, a method for reducing the permeation rate of a permeable species through a polymeric material comprises first identifying a presence of a solubility-increasing species in the polymeric material. The solubility-increasing species increases the solubility of the permeable species in the polymeric material. The method further includes removing or altering at least a portion of the solubility-increasing species in the polymeric material to reduce the solubility of the permeable species in the polymeric material.

The polymeric material may be a monolithic material, or it may be a composite material having fibers, particles, or the like dispersed in it. In a preferred application, the polymeric material is an elastomeric polymer such as a fluorocarbon elastomeric polymer or an ethylene propylene elastomeric polymer. Permeation of water through the polymeric materials is of particular interest, and therefore the step of identifying includes identifying the presence of a hygroscopic solubility-increasing species.

The reduction in the solubility-increasing species may be accomplished in different ways to reduce the content of the solubility-increasing species. In one approach, the step of removing or altering includes the steps of providing a piece of the polymeric material, and leaching (i.e., dissolving) the solubility-increasing species from the piece of the polymeric material. In another approach, the step of removing or altering includes the steps of identifying a baseline level of the solubility-increasing species in a commercially available form of the polymeric material, and manufacturing the polymeric material with a target level of the solubility-increasing species less than the baseline level.

Alternatively, the solubility-increasing species may be altered in a manner so that its ability to increase solubility is reduced. Such an alteration may involve, for example, the diffusional introduction of a modifying species in some form that reacts with the solubility-increasing species to reduce its ability to increase the solubility of the permeable species. Alteration could also involve, for example, irradiation of the solubility-increasing species to alter its chemical capability to increase the solubility of the permeable species. The selection of the specific reduction or alteration technique will depend upon the specifics of the permeable species, the identified solubility-increasing species, the application, the article being processed, the thermodynamics and kinetics of the processing, the effect on other properties such as the physical properties, and the process economics.

In a preferred application, a method for reducing the permeation rate of water through a polymeric material comprises the steps of identifying the presence of a hygroscopic species in the polymeric material, and removing or altering at least a portion of the hygroscopic species from the polymeric material to reduce the solubility of the permeable species in the polymeric material. This approach may be used in conjunction with the materials and removal techniques discussed elsewhere herein.

The permeability of a polymeric material to a permeable species (i.e., a diffusate) is a measure of the number of molecules of the permeable species that pass through the polymeric material per unit of time, per unit of area, and per unit of pressure difference that serves as the driving force for the permeation. In a basic model, the permeability P may be expressed as the product of the diffusion coefficient D of the permeable species times the solubility S of the permeable species in the polymeric material, or $P=D \times S$. The present approach reduces the permeability by reducing the solubility. The solubility is reduced by reducing the level of solubility-increasing species, whose presence tends to increase the solubility of the permeable species, from the polymeric material.

In the case of greatest interest where the permeable species is water, the solubility-increasing species include hygroscopic species that are present in the polymeric material. The hygroscopic species are present in the polymeric material as a result of the manufacturing process, and may be present either intentionally or unintentionally. In some cases, the hygroscopic species are present as necessary ingredients in the manufacturing operation and cannot be substantially reduced at the manufacturing stage. In other cases, the concentration of the hygroscopic species may be reduced by taking care in the manufacturing operation. However, because this reduction of the hygroscopic species is not necessary for most applications of the polymeric materials, there is little demand for reducing the hygroscopic species to the extent required for the present approach. Manufacturers may therefore not be inclined to make the required manufacturing changes. In that case, the hygroscopic species may be removed from the finished polymeric-material product by leaching the hygroscopic species from the articles.

Thus, according to the present approach, at least some of the solubility-increasing species for a permeable species of interest are first identified and characterized, by composition, concentration, and chemical character. Then strategies are developed for removing or altering one (or more, if present) of the solubility-increasing species. For example, if there are two different solubility-increasing species present of equal solubility-increasing effect in the polymeric material, it may be better to reduce the concentration of each by fifty percent than to attempt to reduce the concentration of one by one hundred percent. Or if one of the solubility-increasing species has a much larger effect on the solubility of the permeable species than the other, the high-effect solubility-increasing species would be selected for the greatest reduction or alteration efforts.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a graph presenting test results of permeation in untreated samples of a fluorocarbon elastomeric polymer and samples of the same material treated to reduce permeation.

DETAILED DESCRIPTION OF THE INVENTION

The permeability of a polymeric material to a permeable species (i.e., a diffusate) is proportional to the number of molecules of the permeable species that pass through the polymeric material per unit of time, per unit of area, and per unit of pressure difference that serves as the driving force for the permeation. The foundation for the present approach is that the permeability P may be expressed as the product of the diffusion coefficient D of the permeable species in the polymeric material times the solubility S of the permeable species in the polymeric material, or $P=D \times S$. The present approach reduces the permeability P by reducing the solubility S. The solubility is reduced by reducing the content of a "solubility-increasing species", which is defined as a species whose presence in the polymeric material tends to increase the solubility of the permeable species by reversible absorption and desorption.

Figure 1:
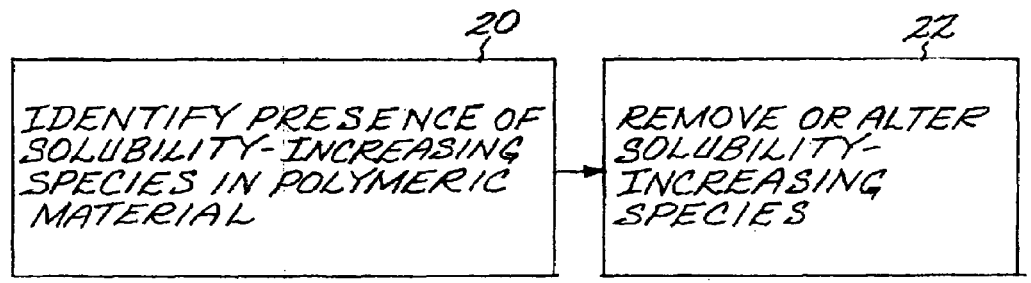
FIG. 1 is a block flow diagram of an approach for practicing the invention.

FIG. 1 depicts a preferred approach for practicing an embodiment of the invention. The presence of a solubility-increasing species in the polymeric material is identified, step 20. This identification is important, because it allows the identification of an appropriate process for reducing the concentration of the solubility-increasing species. The identification of the presence of the solubility-increasing species depends upon the species that is permeating and the polymeric material. In the preferred application, the permeating species is water, and the polymeric species is an elastomeric polymer such as a fluorocarbon (e.g., Viton®) elastomeric polymer or ethylene propylene elastomeric polymer, with the fluorocarbon elastomeric polymer being most preferred. These elastomeric materials are commercially available and are widely used in containers and seals such as O-rings. The following discussion will focus on reducing the permeability of water in the fluorocarbon elastomeric polymer.

Because water is the permeating species, the solubility-increasing species is termed a hygroscopic species. (The term "hydroscopic" is sometimes erroneously used to mean essentially the same thing as "hygroscopic", but the "hygroscopic" usage is preferred and is used here as meaning a species that increases the solubility of water in the polymeric material.) The presence of such a hygroscopic species increases the solubility of water in the polymeric material, thereby increasing the permeability.

The composition of the polymeric species is examined to determine whether any hygroscopic species is present. In the case of the fluorocarbon elastomeric polymer, it is believed that such a hygroscopic species is present. Specifically, calcium fluoride, magnesium oxide, magnesium carbonate, and/or magnesium hydroxide present in the commercially available elastomeric polymeric material are believed to be hygroscopic.

At least a portion of the solubility-increasing hygroscopic species is removed from the polymeric material or altered in character, step 22, with removing being preferred. Two embodiments have been identified for implementing the removal step 22. In the first approach, a piece of the generally available polymeric material is provided. This piece is typically a piece of the commercially available polymeric material. The solubility-increasing species is removed from the piece of the polymeric material, preferably by leaching (i.e., dissolving).

Figure 2:
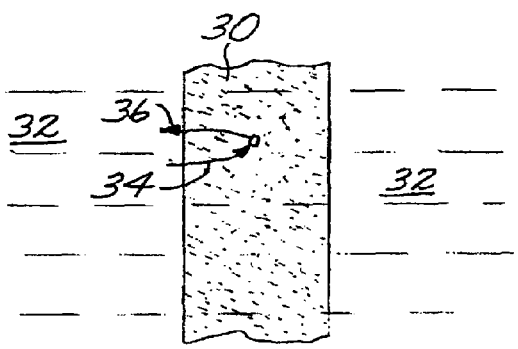
FIG. 2 is a schematic drawing of the mechanism for removing solubility-increasing species from the polymeric material.

FIG. 2 depicts the leaching approach. The piece 30 of the polymeric material, here the fluorocarbon elastomeric material, is immersed in a bath 32 of a leaching solvent that is specific to the solubility-increasing hygroscopic species and does not attack the remainder of the piece 30 of the polymeric material. In the case of the solubility-increasing hygroscopic species present in the fluorocarbon elastomeric material, dilute hydrochloric acid (HCl) dissolves these hygroscopic species but does not dissolve or otherwise attack the fluorocarbon elastomeric material. As schematically depicted in FIG. 2, the solvent diffuses into the piece 30 of the polymeric material, arrow 34, dissolves the solubility-increasing hygroscopic species as a solute, and diffuses out of the piece 30 with the solute, arrow 36. The piece 30 of the polymeric material is left in the solvent bath 32 a sufficient period of time to leach out the desired amount of the solubility-increasing hygroscopic species. The required time depends upon a number of factors, including the diffusion rates of the several species, the relative density of the piece 30 of the polymeric material, the thickness of the piece 30 of the polymeric material, and the desired degree of removal of the solubility-increasing hygroscopic species.

In a second approach, the piece 30 of the polymeric material is manufactured with a reduced level of the solubility-increasing hygroscopic species. In this approach, a baseline level of the solubility-increasing species in a commercially available form of the polymeric material is first identified. The polymeric material is manufactured with a target level of the solubility-increasing species that is less than the baseline level. In the above example, the fluorocarbon elastomeric material is manufactured with a reduced level of calcium fluoride. This second approach is preferred, when possible. However, it may be less practical than the first approach in many instances. The solubility-increasing hygroscopic species may be necessary in the manufacturing operation and therefore cannot be reduced in concentration easily. The reduction of the solubility-increasing hygroscopic species also may be a special order product whose special-manufacturing cost is excessive. In such instances, the first approach may be the only practical path.

Figure 3:
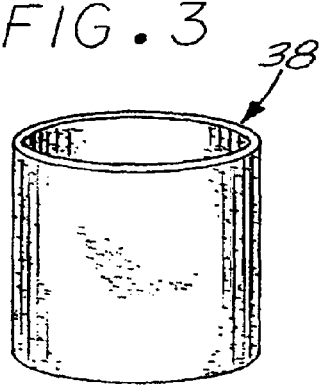
FIG. 3-4 are schematic views of articles that may be made with the present approach, including a container in FIG. 3 and an O-ring seal in FIG. 4.
Figure 4:

FIGS. 3-4 illustrate two types of articles that may be made using the method of the invention, in either of its embodiments. FIG. 3 depicts a container 38, and FIG. 4 depicts a seal 40, in this case an O-ring seal.

The first (leaching) embodiment has been reduced to practice using sheets of Parker Seals V0986-50 fluorocarbon elastomeric polymer, each about 1 millimeter thick. Test sheets of the fluorocarbon elastomeric polymer were immersed into a leaching-solvent bath of a 10 percent by volume solution of hydrochloric acid (HCl) in water, at 90° C. for 20 days, with constant stirring, and the permeation of water through the sheets was periodically measured. Control sheets of the fluorocarbon elastomeric polymer were immersed into a control bath of deionized water at 90° C. for 20 days, with constant stirring, and the permeation of water through the sheets was periodically measured. In each case, the permeation was measured by making the sheet being measured the membrane between two environments, one air at 25° C. and 50 percent relative humidity, and the other air at 25° C. and less than 1 percent relative humidity and including a solid desiccant, according to the Desiccant Method of the ASTM E96-00 testing procedure.

FIG. 5 depicts the test results of total permeation as a function of time, for the control (untreated) sheets that did not have a permeation reduction treatment, and for the test sheets treated by the first embodiment of the permeation reduction treatment of the present approach to reduce permeation. The permeation rate without the leaching treatment of the first embodiment was approximately twice that experienced when the leaching treatment of the first embodiment was used.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for reducing the permeation rate of a permeable species through a polymeric material, comprising the steps of identifying a presence of a solubility-increasing species in the polymeric material, wherein the presence of the solubility-increasing species alters the permeability of the polymeric material by increasing a solubility of the permeable species in the polymeric material; and removing or altering at least a portion of the solubility-increasing species in the polymeric material, wherein the step of removing or altering reduces the solubility of the permeable species in the polymeric material and thereby reduces the permeation rate of the permeable species through the polymeric material.

2. The method of claim 1, wherein the step of removing includes the step of providing the polymer in the form of a container.

3. The method of claim 1, wherein the step of removing includes the step of providing the polymer in the form of a seal.

4. The method of claim 1, wherein the step of removing or altering includes the step of providing an elastomeric polymer.

5. The method of claim 1, wherein the step of removing or altering includes the step of providing a fluorocarbon elastomeric polymer.

6. The method of claim 1, wherein the step of removing or altering includes the step of identifying a hygroscopic solubility-increasing species.

7. The method of claim 1, wherein the step of removing or altering includes the steps of providing a piece of the polymeric material, and leaching the solubility-increasing species from the piece of the polymeric material.

8. The method of claim 1, wherein the step of removing or altering includes the steps of identifying a baseline level of the solubility-increasing species in a commercially available form of the polymeric material, and manufacturing the polymeric material with a target level of the solubility-increasing species less than the baseline level.

9. A method for reducing the permeation rate of water through a polymeric material, comprising the steps of
identifying a presence of a hygroscopic species in the polymeric material, wherein the presence of the hygroscopic species alters the permeability of the polymeric material by increasing the solubility of water in the polymeric material; and
removing or altering at least a portion of the hygroscopic species in the polymeric material, wherein the removing or altering reduces the solubility of water in the polymeric material and thereby reduces the permeation rate of water through the polymeric material.

10. The method of claim 9, wherein the step of removing includes the step of
providing the polymer in the form of a container.

11. The method of claim 9, wherein the step of removing includes the step of
providing the polymer in the form of a seal.

12. The method of claim 9, wherein the step of removing or altering includes the step of
providing an elastomeric polymer.

13. The method of claim 9, wherein the step of removing or altering includes the step of
providing a fluorocarbon elastomeric polymer.

14. The method of claim 9, wherein the step of removing or altering includes the step of
providing an ethylene propylene elastomeric polymer.

15. The method of claim 9, wherein the step of removing or altering includes the step of
providing a piece of the polymeric material, and
leaching the solubility-increasing species from the polymeric material.

16. The method of claim 9, wherein the step of removing or altering includes the steps of
identifying a baseline level of the solubility-increasing species in a commercially available form of the polymeric material, and
manufacturing the polymeric material with a target level of the solubility-increasing species less than the baseline level.

17. A method for reducing the permeation rate of water through a polymeric material, comprising the steps of
identifying a presence of a hygroscopic species in the polymeric material, wherein the hygroscopic species increases a solubility of water in the polymeric material, and wherein the polymeric material is selected from the group consisting of a fluorocarbon elastomeric polymer and an ethylene propylene elastomeric polymer; and
removing or altering at least a portion of the hygroscopic species in the polymeric material to reduce the solubility of water in the polymeric material, wherein the polymeric material is in the form of a seal, a container, or a lining of a container.

18. The method of claim 17, wherein the step of removing or altering includes the step of
providing a piece of the polymeric material, and
leaching the at least some of the hygroscopic species from the polymeric material.

19. The method of claim 17, wherein the step of removing or altering includes the steps of
identifying a baseline level of the hygroscopic species in a commercially available form of the polymeric material, and
manufacturing the polymeric material with a target level of the hygroscopic species less than the baseline level.

* * * * *

UNITED STATES PATENT AND TRADEMARK OFFICE
CERTIFICATE OF CORRECTION

| | | |
|---|---|---|
| PATENT NO. | : 7,297,753 B2 | Page 1 of 1 |
| APPLICATION NO. | : 10/894753 | |
| DATED | : November 20, 2007 | |
| INVENTOR(S) | : David B. Hatfield | |

It is certified that error appears in the above-identified patent and that said Letters Patent is hereby corrected as shown below:

At column 1, prior to line 4, add the following:

The invention was made with United States Government support under Contract Number HQ0006-01-C-0001. The United States Government has certain rights in this invention.

Signed and Sealed this

Twenty-fifth Day of November, 2008

JON W. DUDAS
*Director of the United States Patent and Trademark Office*